US010558912B2

(12) United States Patent
Kwak et al.

(10) Patent No.: US 10,558,912 B2
(45) Date of Patent: Feb. 11, 2020

(54) METHOD AND APPARATUS TO RECOGNIZE OBJECT BASED ON ATTRIBUTE OF OBJECT AND TRAIN

(71) Applicant: Samsung Electronics Co., Ltd., Suwon-si (KR)

(72) Inventors: Youngjun Kwak, Seoul (KR); Byungin Yoo, Seoul (KR); Youngsung Kim, Suwon-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 15/595,997

(22) Filed: May 16, 2017

(65) Prior Publication Data

US 2018/0121748 A1 May 3, 2018

(30) Foreign Application Priority Data

Nov. 2, 2016 (KR) ........................ 10-2016-0145151

(51) Int. Cl.
*G06K 9/00* (2006.01)
*G06N 3/08* (2006.01)
*G06N 3/04* (2006.01)

(52) U.S. Cl.
CPC ............. *G06N 3/08* (2013.01); *G06N 3/0454* (2013.01); *G06N 3/084* (2013.01); *G06K 2009/00322* (2013.01)

(58) Field of Classification Search
None
See application file for complete search history.

(56) References Cited

U.S. PATENT DOCUMENTS 9,152,845 B2 10/2015 Yamada et al.
9,189,679 B2 11/2015 Yamazaki et al.
(Continued)

FOREIGN PATENT DOCUMENTS

JP 2007-257585 A 10/2007
JP 2010-020666 A 1/2010
(Continued)

OTHER PUBLICATIONS

Gao, Wei, and Haizhou Ai. "Face gender classification on consumer images in a multiethnic environment." International Conference on Biometrics. Springer Berlin Heidelberg, 2009.
(Continued)

*Primary Examiner* — Wei Wen Yang
(74) *Attorney, Agent, or Firm* — NSIP Law

(57) ABSTRACT

Provided is a method and apparatus to recognizing an object based on an attribute of the object and training that may calculate object age information from input data using an attribute layer trained with respect to an attribute of an object and a classification layer trained with respect to a classification of the object. The method to recognize the object includes extracting feature data from input data including an object using an object model, determining attribute classification information related to the input data from the feature data using a classification layer, determining attribute age information related to an attribute from the feature data using an attribute layer, and estimating object age information based on the attribute classification information and the attribute age information.

25 Claims, 12 Drawing Sheets

Start

210 Extract feature data from input data including object using object model

220 Calculate attribute classification information related to input data from feature data using classification layer 230 Calculate attribute age information related to attribute from feature data using attribute layer 240 Estimate object age information of object based on attribute classification information and attribute age information End

(56) References Cited

U.S. PATENT DOCUMENTS

| | | | | |
|---|---|---|---|---|
| 9,311,564 | B2 | 4/2016 | Savvides et al. | |
| 2013/0223694 | A1* | 8/2013 | Ricanek, Jr. ....... | G06K 9/00221 382/118 |
| 2014/0201126 | A1* | 7/2014 | Zadeh .................... | G06K 9/627 706/52 |
| 2017/0344879 | A1* | 11/2017 | Merhav ................ | G06N 3/0454 |

FOREIGN PATENT DOCUMENTS

| | | | |
|---|---|---|---|
| KR | 10-1216123 | B1 | 12/2012 |
| KR | 10-1216155 | B1 | 12/2012 |
| KR | 10-2016-0072621 | A | 6/2016 |

OTHER PUBLICATIONS

Park, Jae Un, et al. "A study on the measurement of arousal level by face movement." Journal of the Ergonomics Society of Korea (2010): 219-223.

Lee et al. "Current status of study in face image recognition technology." Journal of the Institute of Electronics Engineers of Korea 23.6. (1996): 688-702.

* cited by examiner

METHOD AND APPARATUS TO RECOGNIZE OBJECT BASED ON ATTRIBUTE OF OBJECT AND TRAIN

CROSS-REFERENCE TO RELATED APPLICATION

This application claims the benefit under 35 USC § 119(a) of Korean Patent Application No. 10-2016-0145151 filed on Nov. 2, 2016, in the Korean Intellectual Property Office, the entire disclosure of which is incorporated herein by reference for all purposes.

BACKGROUND

1. Field

The following description relates to methods and apparatuses for recognizing an object based on an attribute of the object and training for object recognition.

2. Description of Related Art

Research on applications of an efficient pattern recognition method of a human to an actual computer is being conducted to classify a human input pattern. One such area of research is focused on an artificial neural network that models characteristics of biological nerve cells of a human through mathematical expressions. To classify the input pattern, the artificial neural network employs an algorithm that simulates a learning capability of a human to generate mapping between the input pattern and output patterns. The capability to generate such a mapping is referred to as a learning capability of the artificial neural network. Based on the learning result, the artificial neural network generates an output with respect to an input pattern yet to be used for learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object recognition method, including extracting feature data from input data including an object using an object model, determining attribute classification information related to the input data from the feature data using a classification layer, determining attribute age information related to an attribute from the feature data using an attribute layer, and estimating object age information based on the attribute classification information and the attribute age information.

The determining of the attribute classification information may include determining, for each of a plurality of attributes, a probability that the object has the each of the plurality of the attributes.

The determining of the attribute age information may include determining, for each of a plurality of ages, a probability that an object having the attribute belongs to the each of the plurality of the ages.

The estimating may include estimating the object age information based on a probability that the object has each of a plurality of attributes and a probability that the object having the each of the plurality of attributes belongs to each age, calculated for each of the plurality of the attributes.

The determining of the attribute age information may include determining attribute age information related to an attribute designated for each of a plurality of attribute layers from the feature data using the attribute layer.

The object recognition method may include determining whether the object matches a registered user based on user authentication information and at least one of the attribute classification information or the object age information, in response to a user login attempt.

The object recognition method may include determining product recommendation information for a user corresponding to the object based on the attribute classification information and the object age information, and visualizing the determined product recommendation information on a display.

The determining of the attribute classification information may include determining a probability with respect to a gender to which the object belongs from the feature data using the classification layer, the determining of the attribute age information may include determining, for each of genders, a probability that an object corresponding to the gender belongs to an age from the feature data using the attribute layer, and the estimating may include estimating the object age information based on the probability with respect to the gender to which the object belongs and the probability that the object belongs to the age for the each of the genders.

The determining of the attribute classification information may include determining a probability with respect to a race to which the object belongs from the feature data using the classification layer, the determining of the attribute age information may include determining, for each of races, a probability that an object corresponding to the race belongs to an age from the feature data using the attribute layer, and the estimating may include estimating the object age information based on the probability with respect to the race to which the object belongs and the probability that the object belongs to the age for the each of the races.

The object model may include a neural network including layers, and each layer of the layers may include nodes.

In another general aspect, there is provided a method of training a neural network for object recognition, the method including determining an attribute classification loss from training data using an object model and a classification layer connected to the object model, determining an object age loss from the training data using the object model, the classification layer, and an attribute layer connected to the object model, and training the object model, the attribute layer, and the classification layer based on the attribute classification loss and the object age loss.

The determining of the attribute classification loss may include determining attribute classification information from a training input of the training data using the object model and the classification layer, and determining the attribute classification loss based on the attribute classification information and a training classification.

The method may include determining an attribute age loss from the training data using the object model and the attribute layer, wherein the training may include training the object model or the attribute layer based on the attribute age loss.

The determining of the attribute age loss may include determining attribute age information from a training input of the training data using the object model and the attribute layer, and determining the attribute age loss based on the attribute age information and a training attribute age of the training data.

The object model or the attribute layer may include back-propagating the attribute age loss from the attribute layer to an input layer of the object model.

The determining of the object age loss may include determining the object age loss based on attribute classification information calculated using the classification layer and attribute age information calculated using the attribute layer, and the training may include back-propagating the object age loss from the attribute layer or the classification layer to an input layer of the object model.

The training may include back-propagating the attribute classification loss from the classification layer to an input layer of the object model.

The training may include updating a connection weight to connect nodes of each of a plurality of layers constituting the object model.

In another general aspect, there is provided an object recognition apparatus, including a processor configured to extract feature data from input data including an object using an object model, to determine attribute classification information related to the input data from the feature data using a classification layer, to determine attribute age information related to an attribute from the feature data using an attribute layer, and to estimate object age information based on the attribute classification information and the attribute age information.

Other features and aspects will be apparent from the following detailed description, the drawings, and the claims.

Figure 1:
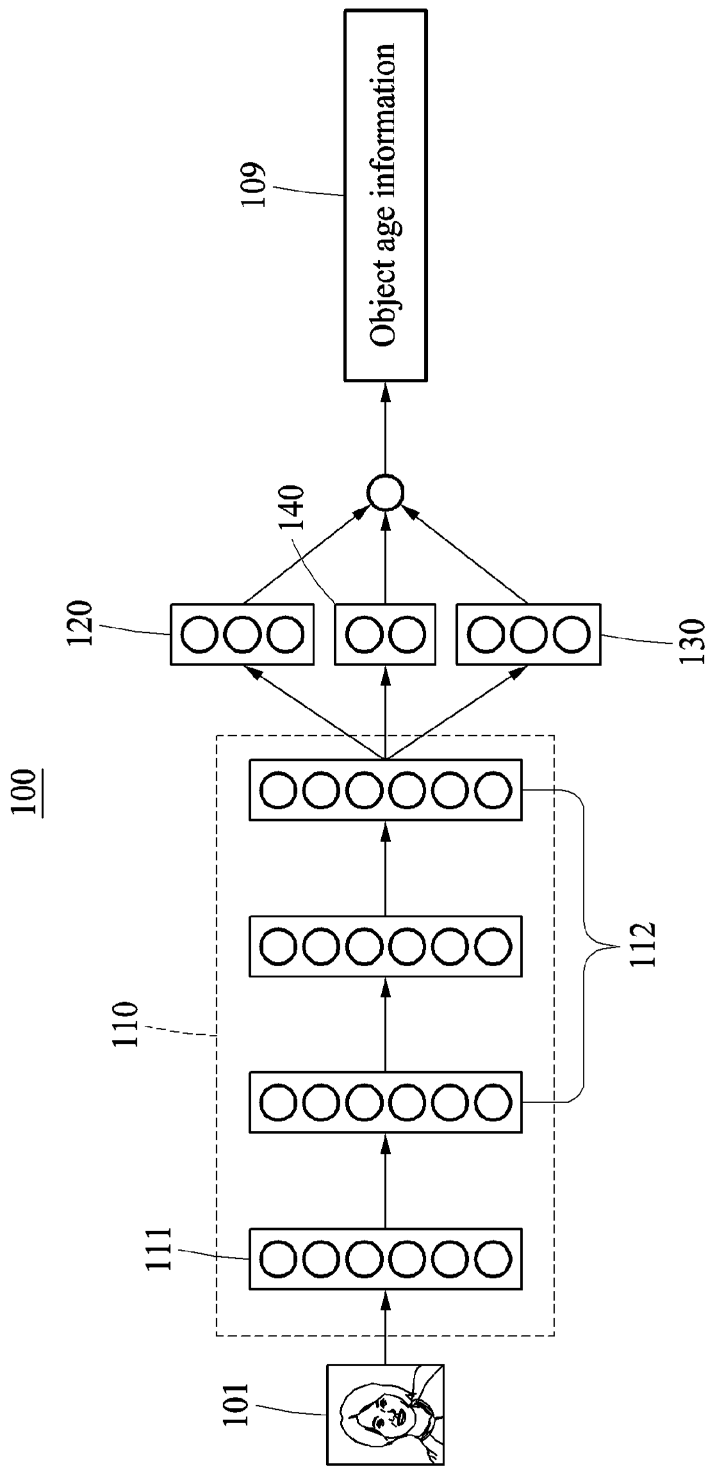
FIG. 1 is a diagram illustrating an example of a structure of an object recognition network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

FIG. 1 is a diagram illustrating an example of a structure of an object recognition network.

An object recognition apparatus estimates object age information 109 from input data 101 using an object recognition network structure 100.

The object recognition network structure 100 includes an object model 110, and layers 120, 130, and 140 connected to the object model 110. The object model 110 is a model trained to output feature data from the input data 101, and includes, for example, a neural network. The neural network may be a convolutional neural network (CNN), or a deep neural network (DNN).

For example, the neural network includes a plurality of layers, and each of the layers includes a plurality of nodes. A node is also referred to as a neuron. Neurons of neighboring layers are connected through edges. An edge is also referred to as a synapse. Connection weights are assigned to the edges through training, and parameters corresponding to layers include such connection weights. A processor computes an output of the layer from an input with respect to the layer based on a connection weight of the layer and an activation function. The object recognition apparatus obtains the object recognition network structure 100 including the neural network from an internal database stored in a memory, or receives the object recognition network structure 100 from an external server through a communicator.

For example, the neural network of the object model 110 is a recognition model that simulates a computation capability of a biological system using a large number of artificial neurons connected through edges. The neural network may be implemented on a hardware. The neural network is also referred to as an artificial neural network.

The neural network uses artificial neurons configured by simplifying functions of biological neurons. The artificial neurons are also referred to as nodes. The artificial neurons are connected to each other through edges having connection weights. The connection weights are predetermined values of the edges, and are also referred to as synapse weights or connection strengths.

The neural network includes a plurality of layers. For example, the neural network includes an input layer 111, a hidden layer 112, and an output layer. The input layer 111 receives an input that is used to perform training or recognition and transmits the input to the hidden layer 112. The output layer generates an output of the neural network based on signals received from the hidden layer 112. In the object recognition network structure 100 of FIG. 1, the output layer includes attribute layers 120 and 130 and a classification layer 140. The hidden layer 112 is disposed between the input layer 111 and the output layer. The hidden layer 112 changes a training input of training data received from the input layer 111 to a predictable value.

The input layer 111, the hidden layer 112, the attribute layers 120 and 130, and the classification layer 140 each include a plurality of nodes. The nodes included in the input layer 111 are referred to as input nodes, and the nodes included in the hidden layer 112 are referred to as hidden nodes.

The input nodes included in the input layer 111 and the hidden nodes included in the hidden layer 112 are connected to each other through edges having connection weights. The hidden nodes included in the hidden layer 112 and output nodes included in the attribute layers 120 and 130 and the classification layer 140 are also connected to each other through edges having connection weights.

As shown in FIG. 1, the neural network includes a plurality of hidden layers 112. The neural network including the plurality of hidden layers 112 is referred to as a DNN. Training the DNN is referred to as deep learning. Assuming that the hidden layer 112 includes a first hidden layer, a second hidden layer, and a third hidden layer as shown in FIG. 1, an output of a hidden node included in the first hidden layer is connected to hidden nodes belonging to the second hidden layer. An output of a hidden node belonging to the second second hidden layer is connected to hidden nodes belonging to the third hidden layer.

For example, the object recognition apparatus and a training apparatus for object recognition input outputs of previous hidden nodes included in a previous hidden layer into each hidden layer through edges having connection weights, and generate outputs of hidden nodes included in a hidden layer based on values obtained by applying the connection weights to the outputs of the previous hidden nodes and activation functions. To fire an output to a next hidden node, a result of the activation functions exceeds a threshold of a current hidden node. In an example, a node maintains a deactivated state without firing a signal to a next node until a predetermined threshold strength of activation is reached through input vectors.

The input data 101 is data acquired by the object recognition apparatus, and is data related to an object. For example, the input data 101 is image data including the object. Feature data is data abstracted from the input data 101, the data representing a feature of the input data 101. For example, the feature data represents a feature of the object included in the input data 101. The object recognition apparatus outputs the feature data from the input data 101 using the object model 110.

The object age information 109 is information indicating an age of the object. For example, in a case in which the object is a human, the object age information 109 indicates an age of the human. The age of the human is designated as an age of 0 based on a year of birth of the human, and is classified based on a period of one year, for example, an age of 1, an age of 2 through an age of 100.

Layers connected to the object model 110 included in the recognition network structure 100 correspond to the output layer, as described above. The output layer includes the first attribute layer 120, the second attribute layer 130, and the classification layer 140. However, a number of the attribute layers may be determined based on a number of attributes classified from the input data 101.

An attribute represents a characteristic of the object, such as, for example, when the object is a human, the attribute is classified by a gender, a race, a height, and a skin color of the human. In another example, with respect to a gender attribute, the object is classified as a male or a female. In another example, with respect to a race attribute, the object is classified as a Caucasian, an Asian, or an African.

The classification layer 140 is a layer trained to classify an attribute of the object from the feature data. The object recognition apparatus classifies the attribute of the object, for example, a gender, using the classification layer 140 from the feature data calculated from the input data 101 including the object. For example, the object recognition apparatus calculates, for each of a plurality of attributes, a probability that the object included in the input data 101 has the attribute using the classification layer 140.

In an example, the first attribute layer 120 is a layer trained to output attribute age information of the object from the feature data when the object has a first attribute. In an example, the second attribute layer 130 is a layer trained to output attribute age information of the object from the feature data when the object has a second attribute. The attribute age information indicates a probability that an object having a predetermined attribute belongs to an age, for each of a plurality of ages. The attribute age information includes information indicating a probability that the object having the predetermined attribute belongs to each of the ages, from an age of 0 to an age of 100. For example, when the attribute is a gender, the first attribute layer 120 is a layer trained to output male attribute age information when the object is a male, and the second attribute layer 130 is a layer trained to output female attribute age information when the object is a female.

Figure 2:
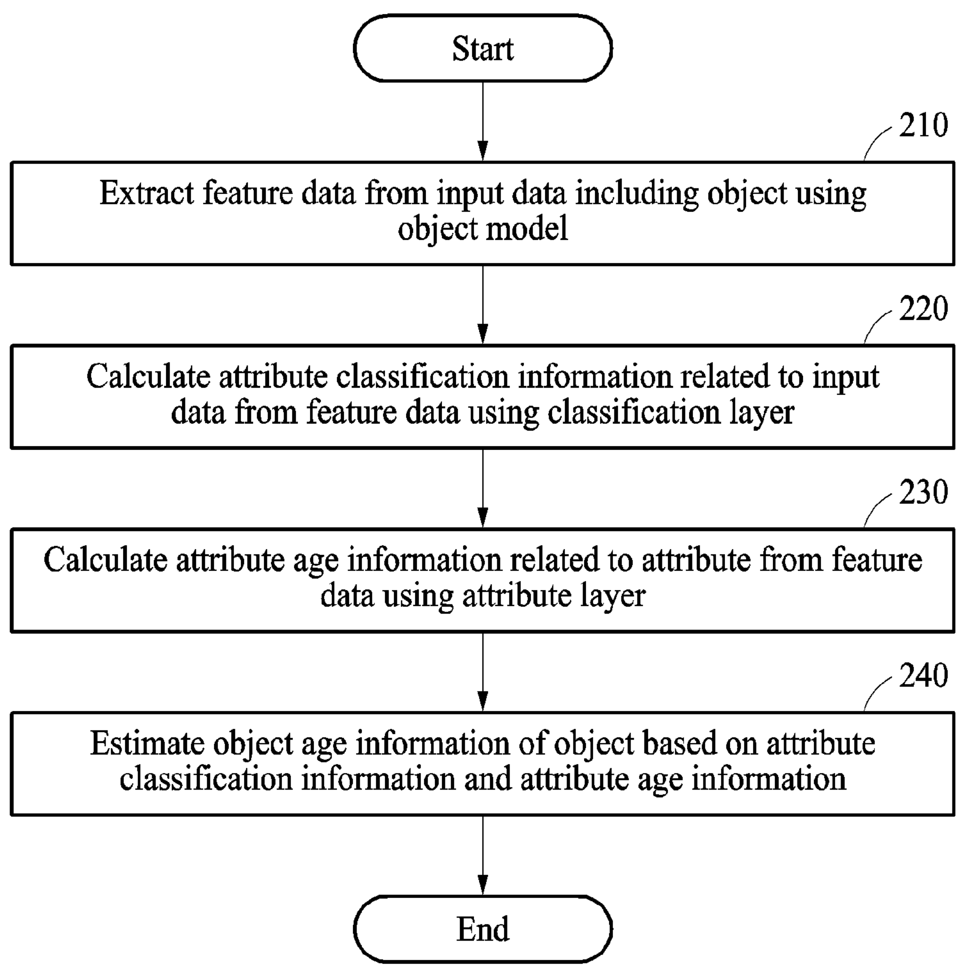
FIG. 2 is a diagram illustrating an example of an object recognition method.

FIG. 2 is a diagram illustrating an example of an object recognition method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the above descriptions of FIG. 1 is also applicable to FIG. 2, and are incorporated herein by reference. Thus, the above description may not be repeated here.

In 210, an object recognition apparatus extracts feature data from input data including an object using an object model.

In 220, the object recognition apparatus calculates attribute classification information related to the input data from the feature data using a classification layer. The object recognition apparatus calculates, for each of a plurality of attributes, a probability that the object included in the input data has the attribute.

In 230, the object recognition apparatus calculates attribute age information related to an attribute from the feature data using an attribute layer. The object recognition apparatus calculates, for each of a plurality of ages, a probability that an object having the attribute belongs to the age. For example, the object recognition apparatus calculates attribute age information related to an attribute designated for each of a plurality of attribute layers from the feature data using the attribute layer.

In 240, the object recognition apparatus estimates object age information of the object based on the attribute classification information and the attribute age information. The object recognition apparatus estimates the object age information based on a probability that the object has an attribute and a probability that the object having the attribute belongs to each age, calculated for each of a plurality of attributes.

In an example, the object recognition apparatus stores the object model, the classification layer, and the attribute layer. in another example, the object recognition apparatus may receive the object model, the classification layer, and the attribute layer from an external device. For example, in response to the object model, the classification layer, and the attribute layer being updated to recent versions, the object recognition apparatus may receive the object model, the classification layer, and the attribute layer from the external device.

The object recognition method will be described in detail with reference to FIGS. 3 through 5.

Figure 3:
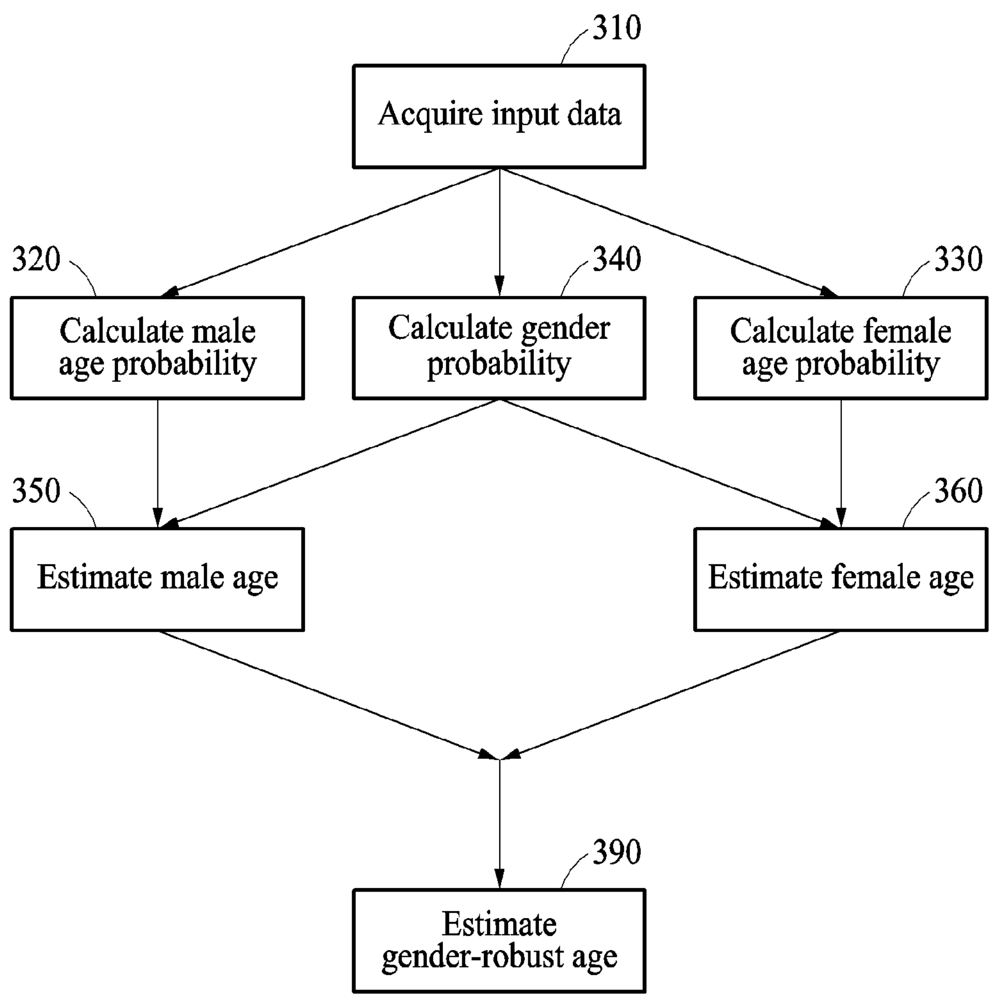
FIG. 3 is a diagram illustrating an example of a process of recognizing an age of an object based on a gender.

FIG. 3 illustrates an example of a process of recognizing an age of an object based on a gender.

An object recognition apparatus estimates attribute age information based on a gender from input data using an object model, an attribute layer, and a classification layer.

In 310, the object recognition apparatus acquires the input data. The object recognition apparatus receives the input data from an external device or acquires the input data by capturing an outside of the object recognition apparatus using a camera module. The object recognition apparatus extracts feature data from the acquired input data using the object model.

In 320, the object recognition apparatus calculates a male age probability from the extracted feature data. The object recognition apparatus calculates the male age probability from the feature data using an attribute layer trained to calculate a male age. In 330, the object recognition apparatus calculates a female age probability from the extracted feature data. The object recognition apparatus calculates the female age probability from the feature data using an attribute layer trained to calculate a female age.

In 340, the object recognition apparatus calculates a gender probability from the extracted feature data. The object recognition apparatus calculates the gender probability from the feature data using a classification layer trained to calculate a male probability and a female probability.

In 350, the object recognition apparatus estimates a male age based on the calculated male age probability and the gender probability. In 360, the object recognition apparatus estimates a female age based on the calculated female age probability and the gender probability.

In 390, the object recognition apparatus estimates a gender-robust age based on the estimated male age and the estimate female age. The object recognition apparatus estimates an age reflecting a gender attribute, and thus obtains an age value of the object estimated to be more robust against a gender. The above example is gender-based age estimation. However, The object recognition apparatus may estimate an age based on various other attributes such as, race and height, without departing from the spirit and scope of the illustrative examples described.

Figure 4:
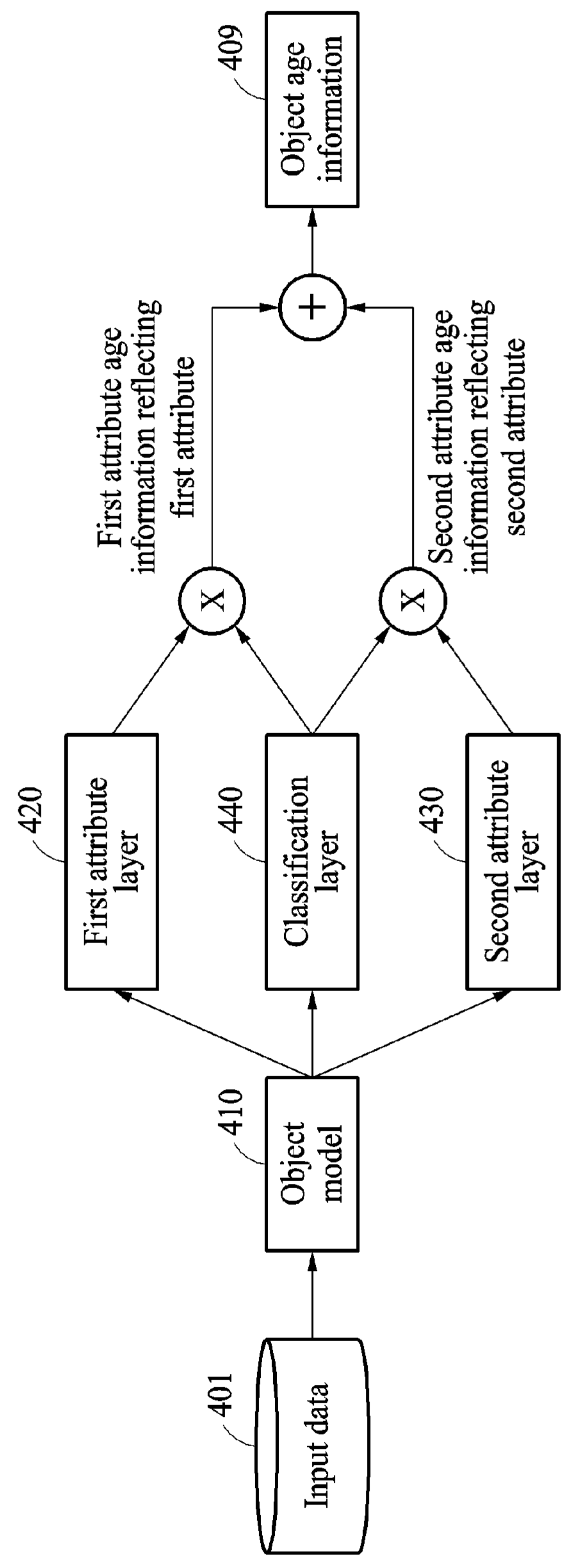
FIG. 4 is a diagram illustrates an example of calculating object age information using an object recognition network.

FIG. 4 illustrates an example of calculating object age information using an object recognition network.

An object recognition apparatus estimates object age information 409 from input data 401 using an object recognition network including an object model 410, a first attribute layer 420, a second attribute layer 430, and a classification layer 440.

As described above, the object recognition apparatus calculates, for each age, a probability that an object having a first attribute belongs to the age using the object model 410 and the first attribute layer 420. The object recognition apparatus calculates first attribute age information reflecting the first attribute by performing a multiplying operation with respect to a probability that the object has the first attribute and a probability that the object having the first attribute belongs to each age, calculated through the classification layer 440.

Further, the object recognition apparatus calculates, for each age, a probability that an object having a second attribute belongs to the age using the object model 410 and the second attribute layer 430. The object recognition apparatus calculates second attribute age information reflecting the second attribute by performing a multiplying operation with respect to a probability that the object has the second attribute and a probability that the object having the second attribute belongs to each age, calculated through the classification layer 440.

The object recognition apparatus calculates the object age information 409 by adding up the first attribute age information and the second attribute age information. As described above, the object age information 409 is an age reflecting a gender attribute.

The first attribute age information and the second attribute age information will be described further with reference to FIG. 5.

Figure 5:
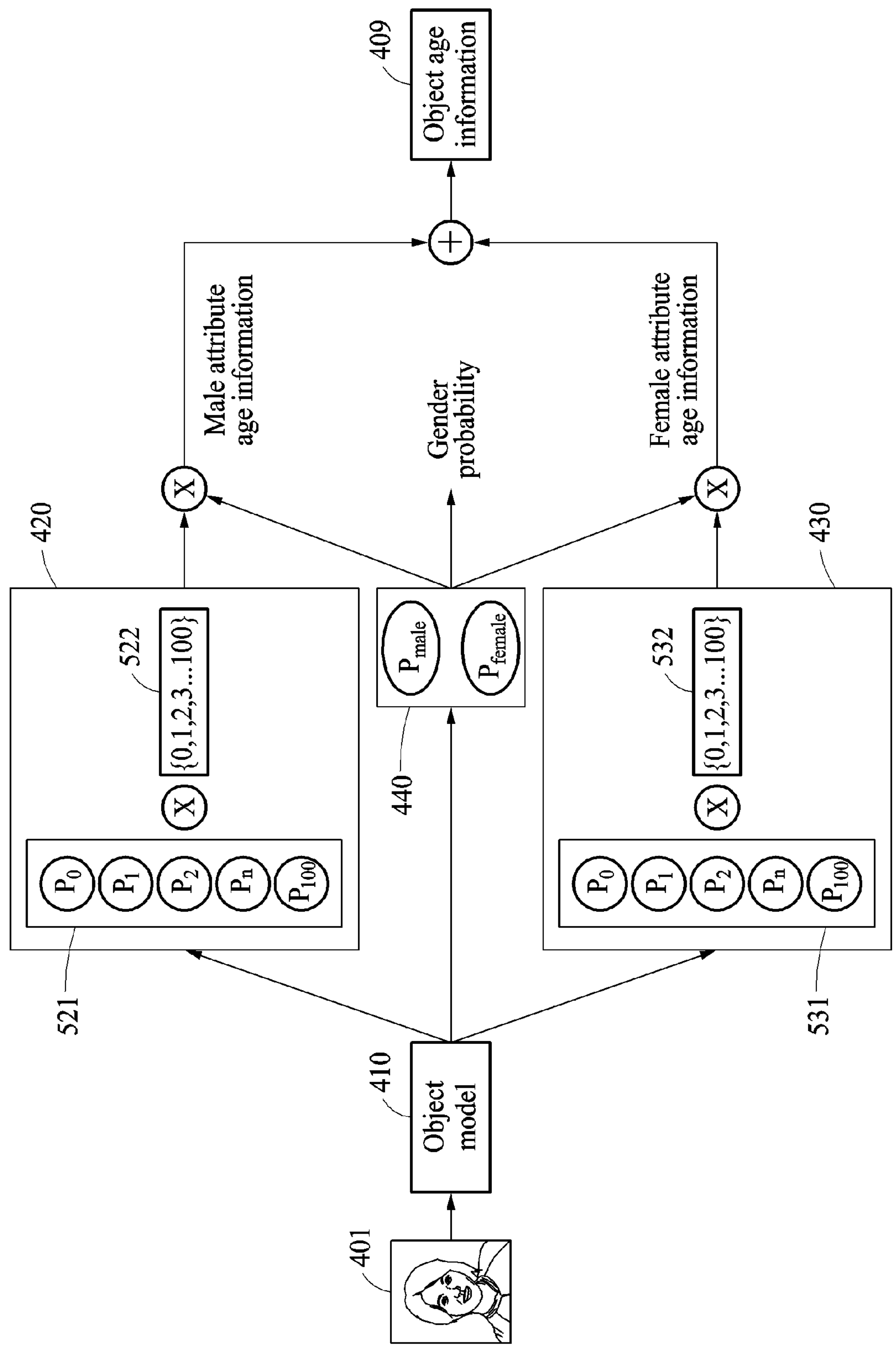
FIG. 5 is a diagram illustrating an example of a configuration of an object recognition network.

FIG. 5 illustrates an example of a configuration of an object recognition network.

Hereinafter, a case in which a first attribute is a male attribute and a second attribute is a female attribute will be described as an example.

An object recognition apparatus calculates, for each gender, a probability that an object having the gender belongs to an age from feature data using the attribute layer 420 or 430. For example, the object recognition apparatus calculates a probability that an object having the first attribute belongs to each age using the first attribute layer 420 from the feature data extracted using an object model. The object recognition apparatus calculates, for a plurality of ages 522, probabilities 521 that the object belongs to the respective ages. For example, the probabilities 521 that the object belongs to the respective ages include a probability that the object being a male belongs to an age of 0, a probability that the object being a male belongs to an age of 1, a probability that the object being a male belongs to an age of 2, through a probability that the object being a male belongs to an age of 100. Although the age ranges from the age of 0 to the age of 100, other age ranges could be used without departing from the spirit and scope of the illustrative examples described. The range of age may vary according to a design. Similarly with respect to the female attribute, the object recognition apparatus calculates, for a plurality of ages 532, probabilities 531 that the object belongs to the respective ages. In FIG. 5, $P_n$ denotes a probability that the object is at an age of n, and n is an integer greater than or equal to "0". Although FIG. 5 illustrates ages up to an age of 100, other age ranges could be used without departing from the spirit and scope of the illustrative examples described.

The object recognition apparatus calculates a probability with respect to a gender to which the object included in the input data 401 belongs from the feature data using the classification layer 440. For example, the object recognition apparatus calculates a probability $P_{male}$ that the object corresponds to a male and a probability $P_{female}$ that the object corresponds to a female from the feature data using the classification layer 440.

The object recognition apparatus estimates the object age information 409 based on the probability with respect to the gender to which the object belongs, and the probability that the object belongs to an age with respect to each of the genders. For example, the object recognition apparatus calculates male attribute age information and female attribute age information by performing a multiplying operation with respect to the probability with respect to each gender and the probability that the object belongs to the age for each of the genders, and calculates the object age information 409 by adding up the male attribute age information and the female attribute age information.

Although object recognition performed based on a gender attribute has been described above with reference to FIG. 5, examples are not limited thereto. For example, the object recognition apparatus may recognize an age of the object based on a race attribute without departing from the spirit and scope of the illustrative examples described.

In another example, the object recognition apparatus calculates a probability with respect to a race to which the object included in the input data belongs from the feature data using the classification layer. Further, the object recognition apparatus calculates, for each of races, a probability that the object corresponding to the race belongs to an age from the feature data using the attribute layer. Furthermore, the object recognition apparatus estimates the object age information based on the probability with respect to the race to which the object belongs and the probability that the object belongs to the age for each of the races.

Figure 6:
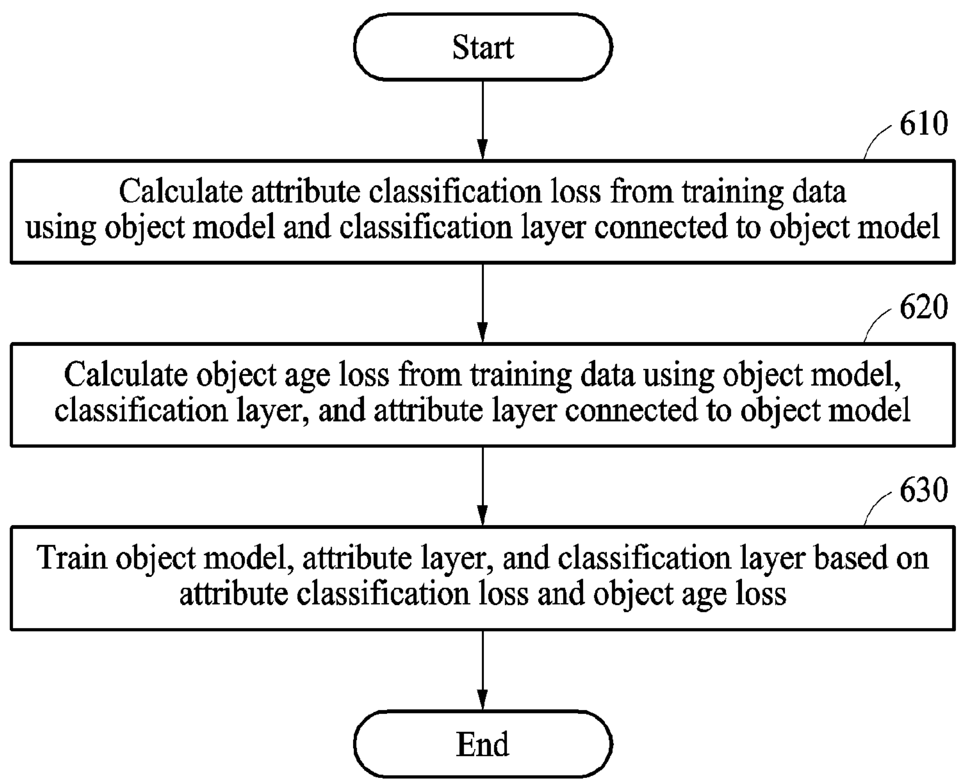
FIG. 6 is a diagram illustrating an example of a training method for object recognition.

FIG. 6 is a diagram illustrating an example of a training method for object recognition. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the above descriptions of FIGS. 1-5 is also applicable to FIG. 6, and are incorporated herein by reference. Thus, the above description may not be repeated here.

Referring to FIG. 6, in 610, a training apparatus for object recognition, hereinafter referred to as the training apparatus, calculates an attribute classification loss from training data using an object model and a classification layer connected to the object model. The training apparatus calculates attribute classification information from a training input of the training data using the object model and the classification layer, and calculates the attribute classification loss based on the attribute classification information and a training classification.

In 620, the training apparatus calculates an object age loss from the training data using the object model, the classification layer, and an attribute layer connected to the object model. The training apparatus calculates the object age loss based on the attribute classification information calculated using the classification layer and attribute age information calculated using the attribute layer.

In 630, the training apparatus trains the object model, the attribute layer, and the classification layer based on the attribute classification loss and the object age loss. The training apparatus back-propagates the object age loss from at least one of the attribute layer or the classification layer to an input layer of the object model. Further, the training apparatus back-propagates the attribute classification loss from the classification layer to the input layer of the object model. Through back-propagation, the training apparatus updates a connection weight to connect nodes of each of a plurality of layers constituting the object model.

Back-propagation learning for training an object recognition network structure will be described further below.

Figure 7:
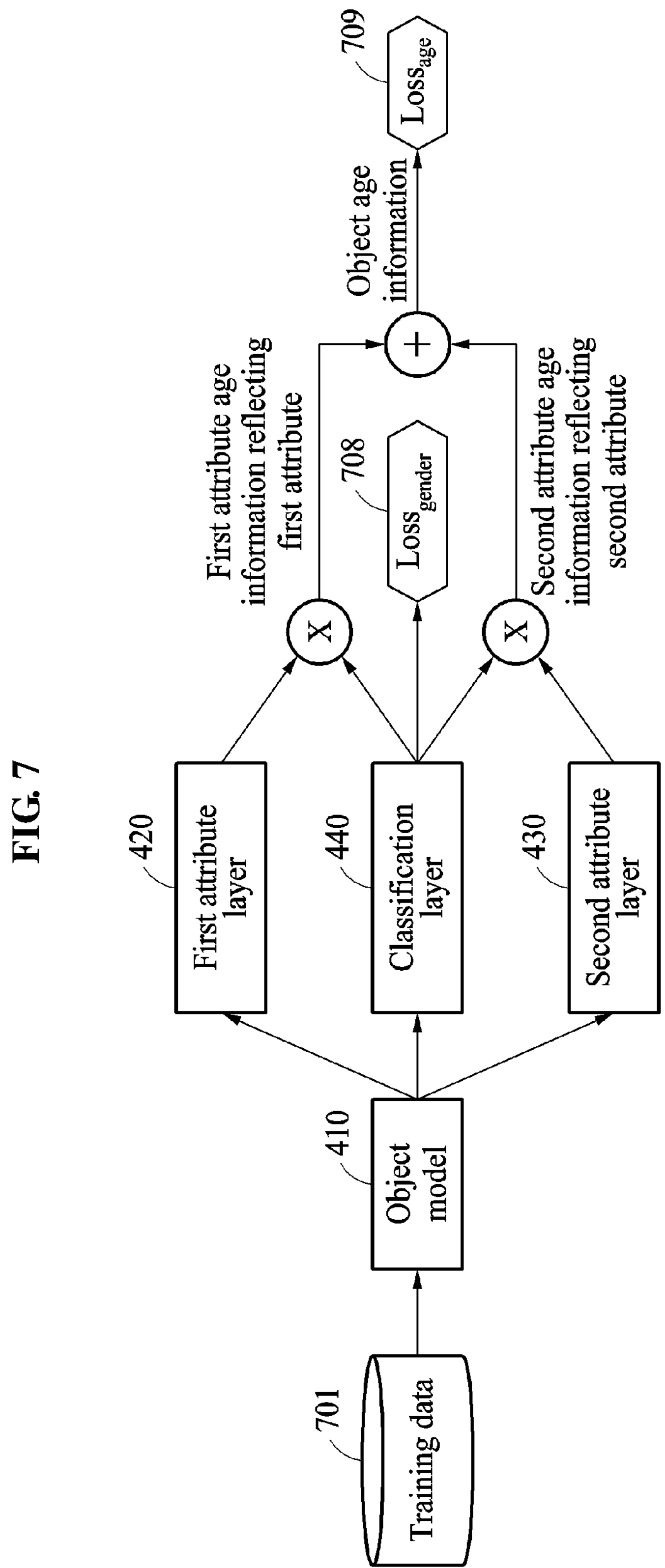
FIG. 7 is a diagram illustrating an example of a process of calculating a loss of an object recognition network.

FIG. 7 illustrates an example of a process of calculating a loss of an object recognition network.

A training apparatus for object recognition, hereinafter referred to as the training apparatus, trains an object recognition network structure based on training data 701.

The training apparatus trains the object recognition network structure through supervised learning. The training apparatus may be implemented as hardware modules, or a combination of hardware and software modules. Supervised learning refers to a method of inputting a training input of the training data 701 and a training output corresponding thereto into the object recognition network structure, and updating connection weights of edges so that output data corresponding to the training output of the training data 701 is output. Although FIG. 7 illustrates a structure of a neural network as a structure of nodes, examples are not limited thereto. Various data structures may be used to store the neural network in a memory storage without departing from the spirit and scope of the illustrative examples described.

The training apparatus determines parameters of the nodes through a gradient descent scheme which is based on losses 708 and 709 to be back-propagated to the neural network and output values of the nodes included in the neural network. For example, the training apparatus updates the connection weights among the nodes through loss back-propagation learning. Loss back-propagation learning refers to a method of estimating the losses 708 and 709 with respect to the provided training data 701 through forward computation, and updating connection weights to reduce a loss while propagating the estimated losses 708 and 709 in a backward direction from an output layer toward a hidden layer and an input layer. Processing of the object recognition network structure is performed in a direction of the input layer→the hidden layer→the output layer. However, in the loss back-propagation learning, the connection weights are updated in a direction of the output layer→the hidden layer→and the input layer (refer to FIG. 8). To process the object recognition network structure as desired, one or more processors use a buffer memory configured to store layers or a series of computed data.

The training apparatus defines an objective function to be used to measure optimalities of currently set connection weights, continuously changes the connection weights based on a result of the objective function, and iteratively performs training. For example, the objective function is a loss function to be used by the object recognition network structure to calculate a loss between an actual output value and a value expected to be output with respect to the training input of the training data 701. The training apparatus updates the connection weights to reduce a value of the loss function.

In an example, the training apparatus calculates the object age loss $Loss_{age}$ 709 and the attribute classification loss $Loss_{gender}$ 708 to train the object recognition network structure. For example, the training apparatus estimates object age information from the training input of the training data 701 based on the object model 410, the first attribute layer 420, the second attribute layer 430, and the classification layer 440. The training apparatus calculates the object age loss $Loss_{age}$ 709 based on the estimated object age information and the training output of the training data 701. The object age loss $Loss_{age}$ 709 is calculated based on an objective function, and the objective function may change according to a design.

The training apparatus estimates attribute classification information from the training input of the training data 701 based on the object model 410 and the classification layer 440, and calculates the attribute classification loss $Loss_{gender}$ 708 based on the attribute classification information and a training classification of the training data 701.

Figure 8:
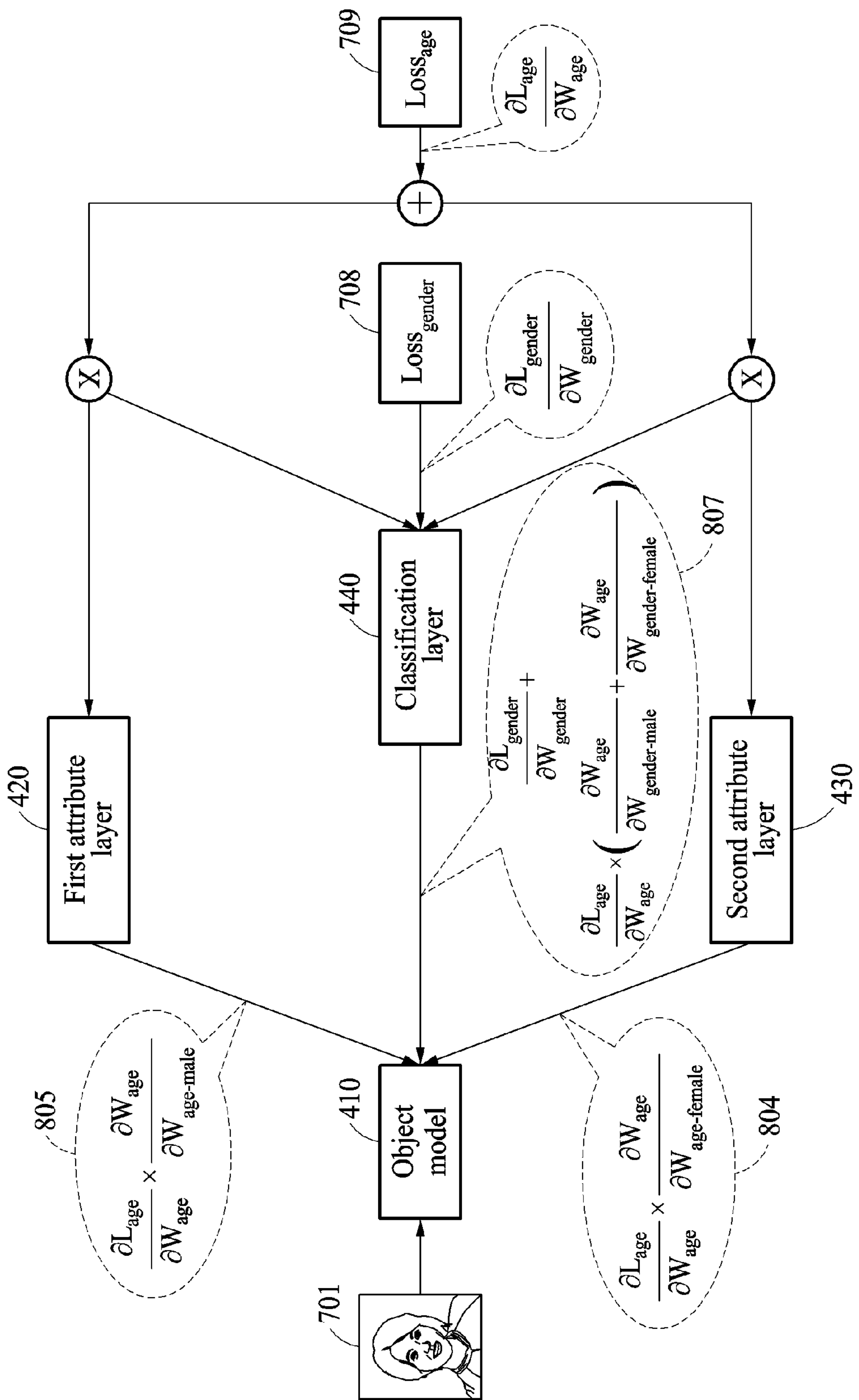
FIG. 8 is a diagram illustrating an example of back-propagation learning of an object recognition network.

FIG. 8 illustrates an example of back-propagation learning of an object recognition network.

FIG. 8 illustrates training through back-propagation of the losses calculated in FIG. 7. The training apparatus back-propagates the object age loss $Loss_{age}$ 709 in a direction from at least one of the first attribute layer 420, the second attribute layer 430, or the classification layer 440 to the input layer of the object model 410. For example, the training apparatus calculates the object age loss $Loss_{age}$ 709 as expressed by Equation 1.

$$Loss_{age} = \|Y_{age} - \hat{A}\|_2 \quad \text{[Equation 1]}$$

In Equation 1, $Y_{age}=\{0, \ldots, 100\}$, which denotes numbers corresponding to ages. A loss function according to Equation 1 is a function that considers a gender and an age together. For example, Equation 1 defines a loss function in a form of a Euclidean distance to calculate an age, and is used for estimating an age, which is a successive numerical value.

Further, $\hat{A}$ in Equation 1 is expressed using a product of an estimated age probability and an estimated gender probability, as given by Equation 2.

$$\hat{A} = \sum_{age=0}^{100} \sum_{gender=0}^{1} \hat{P}_{gender}(x) * (\hat{P}_{age}(x) * \text{age}) \quad \text{[Equation 2]}$$

Further, the age probability and the gender probability are expressed through a multinomial logistic regression, as given by Equation 3 and Equation 4, respectively.

$$\hat{P}_{age}(x) = \frac{e^{z_j}}{\sum_{k=0}^{K} e^{z_k}} \text{ for } j = 0, \ldots, 100 \quad \text{[Equation 3]}$$

-continued $$\hat{P}_{gender}(x) = \frac{e^{z_l}}{\sum_{k=0}^{K} e^{z_k}} \text{ for } l = 0, 1 \quad \text{[Equation 4]}$$

The training apparatus calculates the attribute classification loss $Loss_{gender}$ 708 as expressed by Equation 5. The attribute classification loss $Loss_{gender}$ is expressed using softmax.

$$Loss_{gender} = \sum_{gender=0}^{1} Y_{gender} \log(\hat{P}_{gender}(x)), \quad Y_{gender} \in 0, 1 \quad \text{[Equation 5]}$$

In FIG. 8, for legibility, the object age loss $Loss_{age}$ is illustrated as $L_{age}$, and the attribute classification loss $Loss_{gender}$ is illustrated as $L_{gender}$.

The training apparatus differentiates the object age loss $Loss_{age}$ as expressed by Equation 6, and back-propagates the object age loss $Loss_{age}$.

$$\frac{\delta L_{age}}{\delta W_{age}}. \quad \text{[Equation 6]}$$

In Equation 6, $W_{age}$ is expressed by Equation 7.

$$W_{age} = W_{age\_male} \times W_{gender\_male} + W_{age\_female} \times W_{gender\_female} \quad \text{[Equation 7]}$$

W denotes a parameter of an object recognition network, for example, a connection weight assigned to an edge connecting nodes of layers. In Equation 7, $W_{age\_male}$ denotes a parameter to be used to estimate a male age, $W_{gender\_male}$ denotes a parameter to be used to estimate a male gender $W_{age\_female}$ denotes a parameter to be used to estimate a female age, and $W_{gender\_female}$ denotes a parameter to be used to estimate a female gender. Further, the training apparatus differentiates the attribute classification loss $Loss_{gender}$ as expressed by Equation 8, and back-propagates the attribute classification loss $Loss_{gender}$.

$$\frac{\delta L_{gender}}{\delta W_{gender}}. \quad \text{[Equation 8]}$$

The training apparatus calculates a loss 807 as expressed by Equation 9, and back-propagates the loss 807 from the classification layer 440 to the object model 410.

$$\frac{\delta L_{gender}}{\delta W_{gender}} + \frac{\delta L_{age}}{\delta W_{age}} \times \left( \frac{\delta W_{age}}{S W_{gender\_male}} + \frac{\delta W_{age}}{S W_{gender\_female}} \right) \quad \text{[Equation 9]}$$

The training apparatus calculates a loss 805 as expressed by Equation 10, and back-propagates the loss 805 from the first attribute layer 420 to the object model 410.

$$\frac{\delta L_{age}}{\delta W_{age}} \times \frac{\delta W_{age}}{\delta W_{age\_male}} \quad \text{[Equation 10]}$$

The training apparatus calculates a loss 804 as expressed by Equation 11, and back-propagates the loss 804 from the second attribute layer 430 to the object model 410.

$$\frac{\delta L_{age}}{\delta W_{age}} \times \frac{\delta W_{age}}{\delta W_{age\_female}}. \quad \text{[Equation 11]}$$

Although the above example considers a gender as an attribute, examples are not limited thereto. In a case in which object recognition is performed based on various attributes such as a race and a hair color, an object recognition apparatus and the training apparatus use a probability as expressed by Equation 12.

Attribute={Race,Gender,Hair Style,Wearing Style, . . . }

$$P(x)=P_{attr\text{-}race}(x)*P_{attr\text{-}gender}(x)*P_{attr\text{-}hair\ style}(x)* \ldots \quad \text{[Equation 12]}$$

Figure 9:
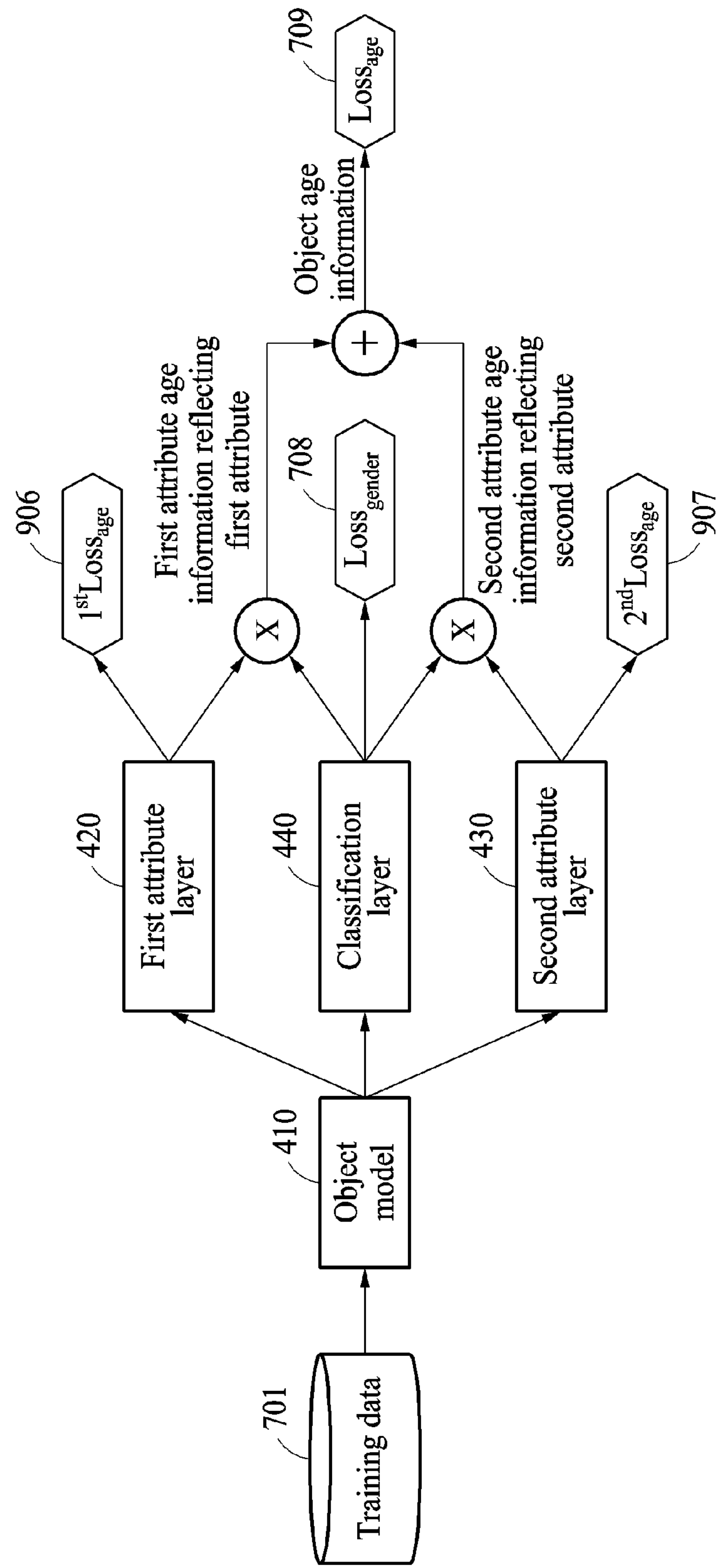
FIG. 9 is a diagram illustrating an example of a process of calculating a loss of an object recognition network.

FIG. 9 illustrates an example of a process of calculating a loss of an object recognition network.

In addition to the training described with reference to FIGS. 7 and 8, the training apparatus reflects attribute age losses 906 and 907 in the training. For example, the training apparatus calculates the attribute age losses 906 and 907 from the training data 701 using the object model 410, the first attribute layer 420, and the second attribute layer 430. In the example of FIG. 9, the attribute age losses 906 and 907 includes a first attribute age loss $1^{st}\text{Loss}_{age}$ 906 and a second attribute age loss $2^{nd}\text{Loss}_{age}$ 907. The training apparatus trains at least one of the object model 410, the first attribute layer 420, or the second attribute layer 430 based on the attribute age losses 906 and 907.

For example, the training apparatus calculates attribute age information from the training input of the training data 701 using the object model 410 and the attribute layer. The training apparatus calculates the attribute age losses 906 and 907 based on the attribute age information and a training attribute age of the training data 701. The training attribute age is an attribute age mapped to the training input in the training data 701, and indicates, for example, a probability with respect to an age corresponding to the training input when the training input corresponds to an attribute. In an example, the attribute is predetermined.

The training apparatus back-propagates the attribute age losses 906 and 907 from the first attribute layer 420 and the second attribute layer 430 to the input layer of the object model 410. The back-propagation process is performed similar to that described with reference to FIG. 8.

Figure 10:
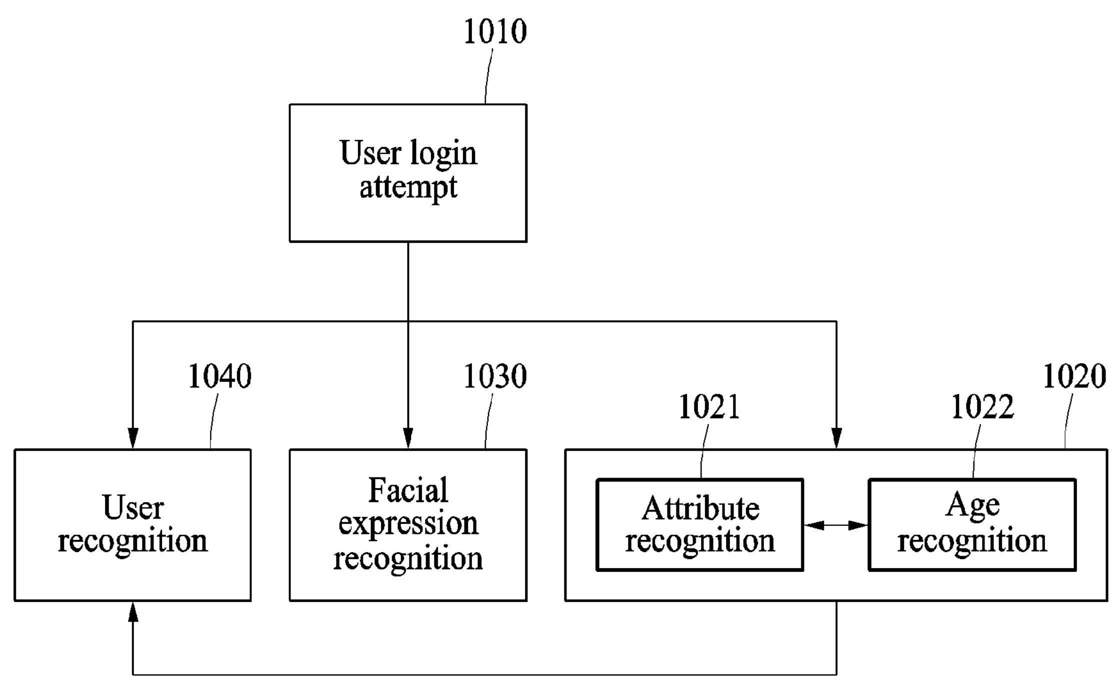
FIGS. 10 and 11 are diagrams illustrating examples of utilizing object recognition.
Figure 11:
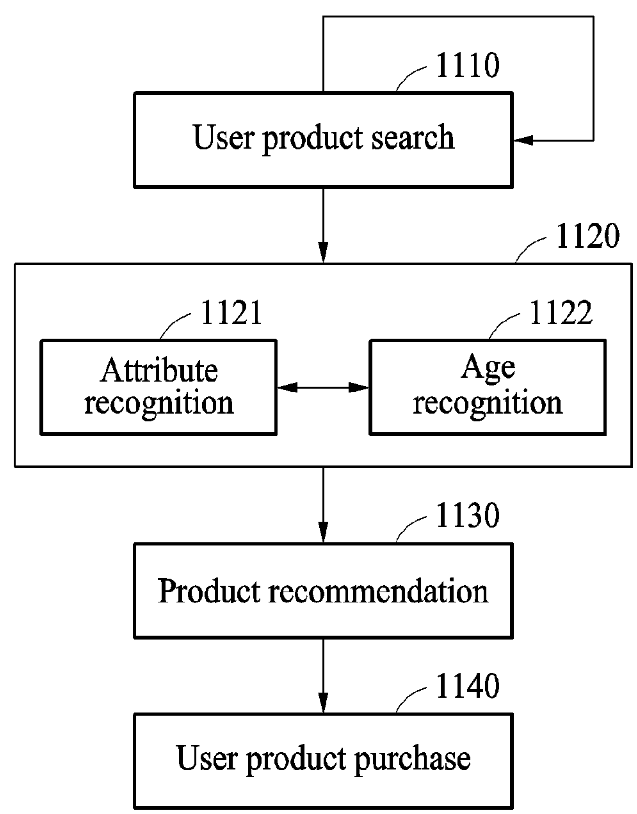

FIGS. 10 and 11 illustrate examples of utilizing object recognition.

FIG. 10 illustrates an example of performing a user recognition 1040 by an object recognition apparatus. The object recognition apparatus performs an object recognition 1020 based on the attributes described with reference to FIGS. 1 through 9, and reflects a result in the user recognition 1040 and a facial expression recognition 1030. The object recognition 1020 performed based on the attributes includes, for example, an attribute recognition 1021 and an age recognition 1022. The object recognition apparatus performs the age recognition 1022 based on the attribute recognition 1021.

The object recognition apparatus determines whether an object matches a registered user based on user authentication information and at least one of attribute classification information or object age information in response to a user login attempt 1010. The user authentication information is information to be used for user authentication, and includes information such as, for example, information related to an account of a user, biometric information of the user, and a password of the user. In response to the object matching the registered user, the object recognition apparatus determines the user performing the user login attempt 1010 to be an authentic user.

When performing the facial expression recognition 1030, the object recognition apparatus reflects a result of the object recognition 1020 performed based on the attributes. The object recognition apparatus estimates an accurate age, and more accurately recognizes a facial expression of the user by reflecting the estimated age.

FIG. 11 illustrates an example of providing a targeted advertisement to a user by an object recognition apparatus.

The object recognition apparatus senses a product search 1110 performed by a user. In response to sensing of the product search 1110, the object recognition apparatus performs an attribute-based age recognition 1120. The attribute-based age recognition 1120 includes an attribute recognition 1121 and an age recognition 1122, as described above. The object recognition apparatus calculates attribute classification information and object age information through the attribute-based age recognition 1120.

The object recognition apparatus performs a product recommendation 1130 based on a result of the attribute-based age recognition 1120. The object recognition apparatus determines product recommendation information to be provided to the user corresponding to an object based on the attribute classification information and the object age information. The object recognition apparatus visualizes the determined product recommendation information on a display of a user terminal. The user makes a product purchase 1140 based on the product recommendation information.

The object recognition apparatus recognizes an accurate age of the user, thereby analyzing and recommending types of products preferred by people at the corresponding age.

Figure 12:
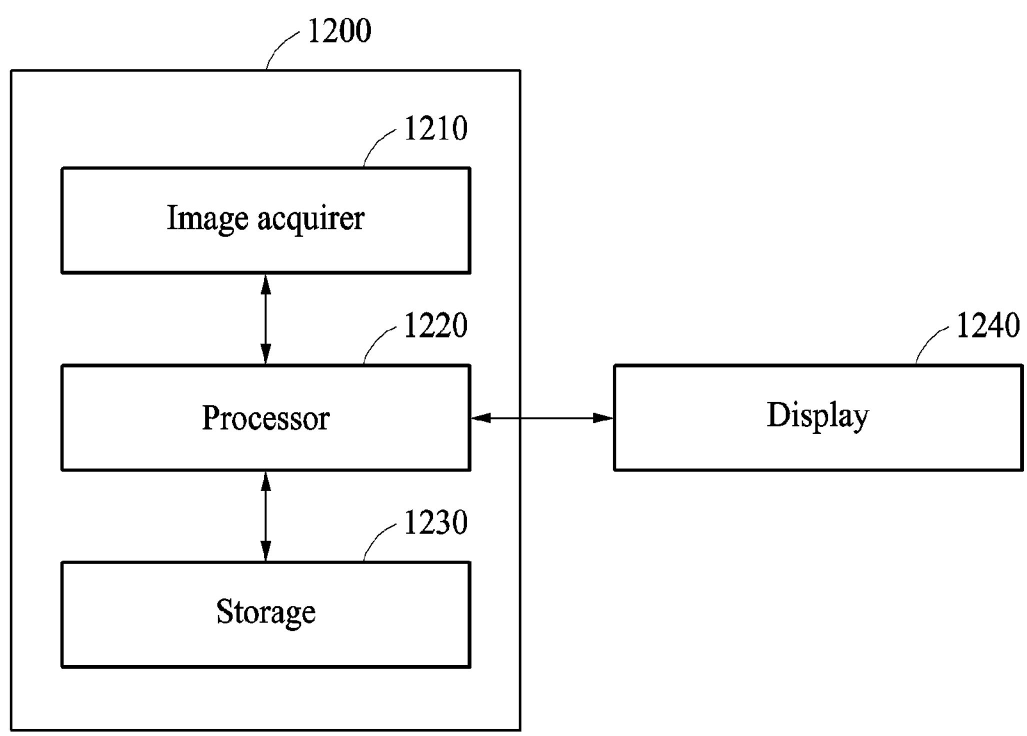
FIG. 12 is a diagram illustrating an example of a configuration of an object recognition apparatus and a training apparatus for object recognition.

FIG. 12 is a diagram illustrating an example of a configuration of an object recognition apparatus and a training apparatus for object recognition.

An apparatus 1200 of FIG. 12 includes an image acquirer 1210, a processor 1220, a storage 1230, and a display 1240. For reference, the apparatus 1200 may operate as at least one of an object recognition apparatus or a training apparatus for object recognition. For example, the apparatus 1200 may operate as the object recognition apparatus described with reference to FIGS. 2 through 5, 10, and 11, or operate as the training apparatus described with reference to FIGS. 6 through 9. In another example, the apparatus 1200 may operate as an apparatus that performs all the operations described with reference to FIGS. 2 through 11.

First, an operation of the apparatus 1200 corresponding to the object recognition apparatus will be described. The object recognition apparatus includes a smart phone, a smart TV, a wearable device, and a home robot.

The image acquirer 1210 acquires input data. The image acquirer 1210 receives the input data from an external device, or acquires image data by capturing an outside of the apparatus 1200.

The processor 1220 performs operations for object recognition based on attributes. For example, the processor 1220 extracts feature data from the input data including an object using an object model, calculates attribute classification information related to the input data from the feature data using a classification layer, calculates attribute age information related to an attribute from the feature data using an attribute layer, and estimates object age information of the object based on the attribute classification information and the attribute age information. Further, the processor 1220 performs the operations described with reference to FIGS. 2 through 5, 10, and 11.

The storage 1230 stores an object recognition network structure. The storage 1230 stores the object model, the attribute layer, and the classification layer, and stores connection weights to connect nodes included in each layer.

Second, an operation of the apparatus 1200 corresponding to the training apparatus will be described.

The image acquirer 1210 acquires training data. The image acquirer 1210 acquires the training data stored in the storage 1230, or receives the training data from an external device.

The processor 1220 performs operations to train an object recognition network structure. The processor 1220 trains the object recognition network structure to output a training output from a training input.

The storage 1230 stores the trained object recognition network structure. The storage 1230 also stores an object recognition network structure that is being trained.

In an example, the apparatus 1200 determines product recommendation information to be provided to the user corresponding to an object based on the attribute classification information and the object age information, and displays the product recommendation on the display 1240. In an example, the display 1240 may be a physical structure that includes one or more hardware components that provide the ability to render a user interface and/or receive user input. The display 1240 can encompass any combination of display region, gesture capture region, a touch sensitive display, and/or a configurable area. In an example, the display 1240 can be embedded in the apparatus 900 for indicating a lane. In an example, the display 1240 is an external peripheral device that may be attached to and detached from the apparatus 1200. The display 1240 may be a single-screen or a multi-screen display. A single physical screen can include multiple displays that are managed as separate logical displays permitting different content to be displayed on separate displays although part of the same physical screen. The display 1240 may also be implemented as an eye glass display (EGD), which includes one-eyed glass or two-eyed glasses.

The object recognition apparatus uses a single network, and thus requires a small memory size, and has a small operation load and a fast operation speed. Further, the object recognition network structure used by the object recognition apparatus trains the attribute layer and the classification layer separately, thereby improving an age recognition rate. For example, the object recognition apparatus trains parameters specialized by genders with respect to the attribute layer and the classification layer.

As a non-exhaustive illustration only, the object recognition apparatus is embedded in or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein or various other Internet of Things (IoT) devices that are controlled through a network. The digital devices may be implemented in a smart appliance, an intelligent vehicle, an apparatus for automatic driving, a smart home environment, a smart building environment, a smart office environment, office automation, and a smart electronic secretary system.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses.

In an example, the object recognition apparatus exhibits an excellent recognition rate within a provided short time when simultaneously performing unlock based on face recognition, ID authentication, and facial expression, gender, and age recognitions in the smart phone.

The object recognition apparatus, training apparatus, apparatus 1200, image acquirer 1210, and other apparatuses, units, modules, devices, and other components illustrated in FIGS. 2 through 12 that perform the operations described herein with respect to FIGS. 2 through 11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object recognition method, comprising:

extracting feature data, using input data comprising an object, from an output layer of a neural network based object model;

determining attribute classification information related to the input data from the extracted feature data using a classification layer connected to the neural network based object model;

determining attribute age information related to an attribute from the feature data using an attribute layer connected to the neural network based object model; and estimating object age information based on the attribute classification information and the attribute age information.

2. The object recognition method of claim 1, wherein the determining of the attribute classification information comprises determining, for each of a plurality of attributes, a probability that the object has the each of the plurality of the attributes.

3. The object recognition method of claim 1, wherein the determining of the attribute age information comprises determining, for each of a plurality of ages, a probability that an object having the attribute belongs to the each of the plurality of the ages.

4. An object recognition method, comprising:

extracting feature data, using input data comprising an object, from an output layer of a neural network based object model;

determining attribute classification information related to the input data from the feature data using a classification layer connected to the neural network based object model;

determining attribute age information related to an attribute from the feature data using an attribute layer connected to the neural network based object model; and estimating object age information of the object based on the attribute classification information and the attribute age information, wherein the estimating comprises estimating the object age information based on a probability that the object has each of a plurality of attributes and a probability that the object having the each of the plurality of attributes belongs to each age, calculated for each of the plurality of the attributes.

5. The object recognition method of claim 1, wherein the determining of the attribute age information comprises determining attribute age information related to an attribute designated for each of a plurality of attribute layers from the feature data using the attribute layer.

6. The object recognition method of claim 1, further comprising:

determining whether the object matches a registered user based on user authentication information and either one or both of the attribute classification information and the object age information, in response to a user login attempt.

7. The object recognition method of claim 1, further comprising:

determining product recommendation information for a user corresponding to the object based on the attribute classification information and the object age information; and visualizing the determined product recommendation information on a display.

8. The object recognition method of claim 1, wherein the determining of the attribute classification information comprises determining a probability with respect to a gender to which the object belongs from the feature data using the classification layer, the determining of the attribute age information comprises determining, for each of genders, a probability that an object corresponding to the gender belongs to an age from the feature data using the attribute layer, and the estimating comprises estimating the object age information based on the probability with respect to the gender to which the object belongs and the probability that the object belongs to the age for the each of the genders.

9. The object recognition method of claim 1, wherein the determining of the attribute classification information comprises determining a probability with respect to a race to which the object belongs from the feature data using the classification layer, the determining of the attribute age information comprises determining, for each of races, a probability that an object corresponding to the race belongs to an age from the feature data using the attribute layer, and the estimating comprises estimating the object age information based on the probability with respect to the race to which the object belongs and the probability that the object belongs to the age for the each of the races.

10. The object recognition method of claim 1, wherein the neural network based object model comprises a neural network comprising layers, and each layer of the layers comprises nodes.

11. A non-transitory computer-readable medium storing instructions that, when executed by a processor, cause the processor to perform the method of claim 1.

12. A method of training a neural network for object recognition, the method comprising:

determining an attribute classification loss from training data using a neural network based object model and a classification layer connected to the neural network based object model;

determining an object age loss from the training data using the neural network based object model, the classification layer, and an attribute layer connected to the neural network based object model; and training the neural network based object model, the attribute layer, and the classification layer based on the attribute classification loss and the object age loss.

13. The method of claim 12, wherein the determining of the attribute classification loss comprises:

determining attribute classification information from a training input of the training data using the neural network based object model and the classification layer; and determining the attribute classification loss based on the attribute classification information and a training classification.

14. The method of claim 12, further comprising:

determining an attribute age loss from the training data using the neural network based object model and the attribute layer, wherein the training comprises training the neural network based object model or the attribute layer based on the attribute age loss.

15. The method of claim 14, wherein the determining of the attribute age loss comprises:

determining attribute age information from a training input of the training data using the neural network based object model and the attribute layer; and determining the attribute age loss based on the attribute age information and a training attribute age of the training data.

16. The method of claim 14, wherein the training of the neural network based object model or the attribute layer comprises back-propagating the attribute age loss from the attribute layer to an input layer of the neural network based object model.

17. The method of claim 12, wherein:

the determining of the object age loss comprises determining the object age loss based on attribute classification information calculated using the classification layer and attribute age information calculated using the attribute layer, and the training comprises back-propagating the object age loss from the attribute layer or the classification layer to an input layer of the neural network based object model.

18. The method of claim 12, wherein the training comprises back-propagating the attribute classification loss from the classification layer to an input layer of the neural network based object model.

19. The method of claim 12, wherein the training comprises updating a connection weight to connect nodes of each of a plurality of layers constituting the neural network based object model.

20. An object recognition apparatus, comprising:

a processor configured to:

extract feature data, using input data comprising an object, from an output layer of a neural network based object model;

determine attribute classification information related to the input data from the extracted feature data using a classification layer connected to the neural network based object model;

determine attribute age information related to an attribute from the feature data using an attribute layer connected to the neural network based object model; and estimate object age information based on the attribute classification information and the attribute age information.

21. The object recognition method of claim 1, wherein the attribute includes any one or any combination of any two or more of a gender, a race, a height, and a skin color.

22. The object recognition method of claim 1, wherein the object age information indicates the age of the object.

23. The object recognition method of claim 1, wherein the determining of the attribute age information comprises calculating first attribute age information reflecting a first attribute by performing a multiplication operation with respect to a probability that the object has the first attribute and a probability that the object having the first attribute belongs to each age.

24. The object recognition method of claim 23, wherein the determining of the attribute age information further comprises calculating second attribute age information reflecting a second attribute by performing a multiplication operation with respect to a probability that the object has the second attribute and a probability that the object having the second attribute belongs to each age.

25. The object recognition method of claim 24, wherein the wherein the estimating of the object age information comprises calculating the object age information by summing the first attribute age information and the second attribute age information.

* * * * *